United States Patent
Murray et al.

(10) Patent No.: US 10,836,437 B2
(45) Date of Patent: Nov. 17, 2020

(54) IMPACT PERFORMANCE

(71) Applicant: NIO USA, Inc., San Jose, CA (US)

(72) Inventors: Paul R. Murray, San Jose, CA (US); Geoffrey Daniel Young, San Jose, CA (US)

(73) Assignee: NIO USA, Inc., San Jose, CA (US)

( * ) Notice: Subject to any disclaimer, the term of this patent is extended or adjusted under 35 U.S.C. 154(b) by 0 days.

(21) Appl. No.: 16/233,957

(22) Filed: Dec. 27, 2018

(65) Prior Publication Data

US 2020/0207420 A1   Jul. 2, 2020

(51) Int. Cl.
*B62D 21/15* (2006.01)
*B62D 25/02* (2006.01)
*B60J 5/04* (2006.01)
*B62D 25/08* (2006.01)
*B62D 25/04* (2006.01)
*B60J 5/10* (2006.01)
*B62D 25/12* (2006.01)

(52) U.S. Cl.
CPC .......... *B62D 25/025* (2013.01); *B60J 5/0412* (2013.01); *B60J 5/107* (2013.01); *B62D 21/157* (2013.01); *B62D 25/04* (2013.01); *B62D 25/081* (2013.01); *B62D 25/087* (2013.01); *B62D 25/12* (2013.01); *B60J 5/04* (2013.01)

(58) Field of Classification Search
CPC .... B62D 21/157; B62D 25/025; B62D 25/08; B62D 25/081; B62D 25/087; B62D 25/10; B62D 25/12; B62D 33/0273; B60J 5/101; B60J 5/107; B60J 5/0412; B60J 5/0423; B60J 5/0427; B60J 5/0451; B60J 5/0458
See application file for complete search history.

(56) References Cited

U.S. PATENT DOCUMENTS

| | | | | |
|---|---|---|---|---|
| 3,788,686 | A * | 1/1974 | Rossie | B60J 5/0458 296/146.6 |
| 3,819,228 | A * | 6/1974 | Cornacchia | B62D 25/025 296/146.9 |
| 3,887,227 | A * | 6/1975 | Deckert | B60J 5/0458 296/187.12 |
| 4,307,911 | A | 12/1981 | Pavlik | |
| 4,462,633 | A * | 7/1984 | Maeda | B62D 25/025 296/146.6 |
| 4,488,751 | A * | 12/1984 | Kling | B60J 5/0427 296/146.6 |
| 4,915,442 | A * | 4/1990 | Garnweidner | B60J 5/044 296/146.6 |
| 5,029,934 | A * | 7/1991 | Schrader | B60J 5/0458 296/146.1 |
| 5,197,560 | A * | 3/1993 | Oda | B60R 19/00 180/274 |

(Continued)

*Primary Examiner* — Gregory A Blankenship
(74) *Attorney, Agent, or Firm* — Sheridan Ross, P.C.

(57) ABSTRACT

A vehicle with improved body—closure impact performance may include a frame having an outer side and an inner side, the frame comprising a door opening, a door sill secured to the frame and extending along an edge of the door opening, the door sill extruded to comprise an elongate cavity; and a door secured to the frame and comprising an elongate protrusion, the door movable between an open position and a closed position, where the elongate cavity is positioned to receive the elongate protrusion when the door is in the closed position.

20 Claims, 7 Drawing Sheets

(56) References Cited

U.S. PATENT DOCUMENTS

| | | | | |
|---|---|---|---|---|
| 5,570,922 A | * | 11/1996 | DeRees | B60J 5/0412 |
| | | | | 296/146.6 |
| 5,765,906 A | * | 6/1998 | Iwatsuki | B21C 23/145 |
| | | | | 296/203.03 |
| 5,806,917 A | * | 9/1998 | Townsend | B60J 5/0426 |
| | | | | 296/202 |
| 6,659,537 B2 | * | 12/2003 | Moriyama | B60J 5/0412 |
| | | | | 296/146.12 |
| 6,749,253 B1 | * | 6/2004 | Zummallen | B60J 5/0458 |
| | | | | 296/146.9 |
| 7,520,557 B2 | * | 4/2009 | Yoshida | B60J 5/06 |
| | | | | 296/146.6 |
| 7,527,321 B1 | * | 5/2009 | Benderoth | B60J 5/0458 |
| | | | | 296/146.6 |
| 8,661,617 B1 | | 3/2014 | Kim | |
| 8,882,180 B2 | | 11/2014 | van Oirschot | |
| 9,738,324 B1 | * | 8/2017 | Vigil | B62D 25/04 |
| 2003/0006625 A1 | * | 1/2003 | Moriyama | B60J 5/0412 |
| | | | | 296/146.6 |
| 2011/0115259 A1 | * | 5/2011 | Mizuta | B62D 25/12 |
| | | | | 296/193.11 |
| 2011/0291442 A1 | * | 12/2011 | Oirschot | B60J 5/0458 |
| | | | | 296/187.12 |
| 2015/0076864 A1 | * | 3/2015 | Faruque | B60J 5/0458 |
| | | | | 296/187.12 |
| 2015/0123427 A1 | * | 5/2015 | Faruque | B60J 5/0461 |
| | | | | 296/187.12 |
| 2018/0029646 A1 | * | 2/2018 | Kanagai | B62D 21/157 |
| 2019/0283806 A1 | * | 9/2019 | Kato | B60J 5/0458 |

* cited by examiner

IMPACT PERFORMANCE

FIELD

The present disclosure is generally directed to vehicle impact performance, and more particularly to structures and methods for improving vehicle impact performance.

BACKGROUND

During impact of a vehicle with another object, energy is absorbed through deformation of the body and closure structures. Current automotive closures are held in place through latches and hinge mechanisms. Additional interlocking pins are present on some vehicles to further connect the door structure to the body during side impacts. Latches, hinge mechanisms, and interlocking pins have been used on hoods to prevent contact between the hood and windshield during frontal impact.

U.S. Pat. No. 4,307,911, entitled "Reinforcement Means for Resisting Side Impacts Against an Automobile Door," describes a door connected between reinforced "A" and "B" posts of an automobile, where the door includes a horizontal beam extending from the front to the rear of the door. Extension members are connected to the beam, and interlock members connect the extension members to the side sill of the automobile.

U.S. Pat. Nos. 8,661,617 and 8,882,180, each entitled "Hooking Structure of Vehicle Door," each describe a hooking structure disposed on a door of a vehicle that ensures passenger safety by preventing the door from being pushed inside. The structure is configured with a welding flange for fastening to the inner panel of a vehicle door and a hooking flange that is aligned with holes where the side outer panel and the side member are formed in the door sill.

DETAILED DESCRIPTION

Embodiments of the present disclosure will be described in connection with a vehicle, and more particularly with respect to an automobile. However, for the avoidance of doubt, the present disclosure encompasses the use of the aspects described herein in vehicles other than automobiles.

Figure 1:
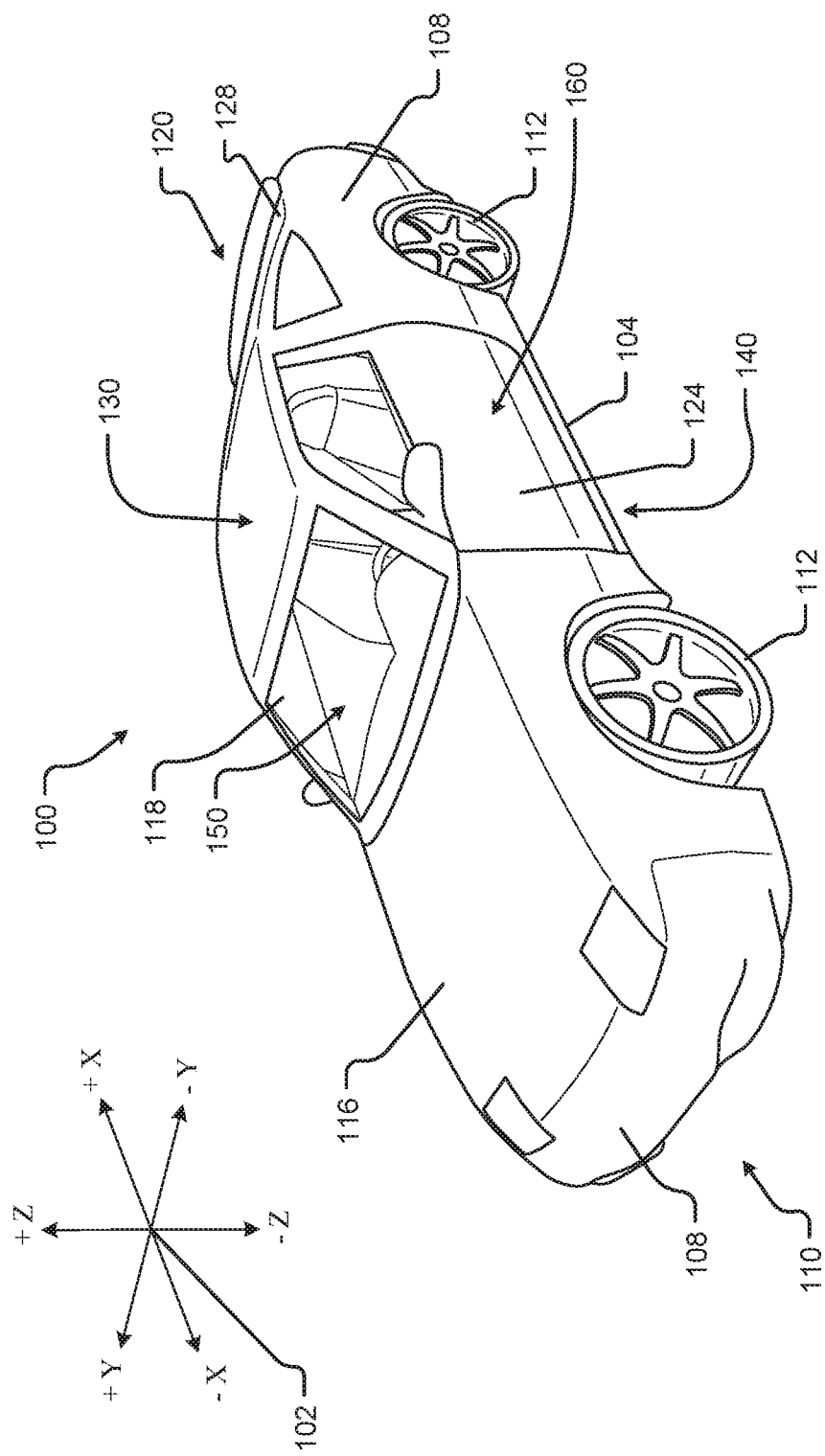
FIG. 1 shows a vehicle in accordance with embodiments of the present disclosure.

FIG. 1 shows a perspective view of a vehicle 100 in accordance with embodiments of the present disclosure. The vehicle 100 comprises a vehicle front 110, vehicle aft 120, vehicle roof 130, at least one vehicle side 160, a vehicle undercarriage 140, and a vehicle interior 150. The vehicle 100 may include a frame 104, a door 124 positioned in a door opening of the frame 104, a hood 116 positioned in a forward opening of the frame 104, a rear hatch or trunk lid 128 positioned in a rear opening of the frame 104, one or more body panels 108 mounted or affixed to the frame, and a windshield 118. The vehicle 100 may include one or more interior components (e.g., components inside an interior space 150, or user space, of a vehicle 100, etc.), exterior components (e.g., components outside of the interior space 150, or user space, of a vehicle 100, etc.), drive systems, controls systems, structural components, etc.

Coordinate system 102 is provided for added clarity in referencing relative locations in the vehicle 100. In this detailed description, an object is forward of another object or component, or is toward the front, if the object is located in the −X direction relative to the other object or component. Conversely, an object is rearward of another object or component, or is toward the rear, if the object is located in the +X direction relative to the other object or component. Similarly, forward movement refers to movement in the −X direction, and backward movement refers to movement in the +X direction. The axes of the coordinate system 102 are referenced throughout this description.

The vehicle 100 may be, by way of example only, an electric vehicle or a gas-powered vehicle. Where the vehicle 100 is an electric vehicle, the vehicle 100 may comprise one or more electric motors powered by electricity from an on-board battery pack. The electric motors may, for example, be mounted near or adjacent an axis or axle of each wheel 112 of the vehicle, and the battery pack may be mounted on the vehicle undercarriage 140. In such embodiments, the front compartment of the vehicle, referring to the space located under the vehicle hood 116, may be a storage or trunk space. Where the vehicle 100 is a gas-powered vehicle, the vehicle 100 may comprise a gas-powered engine and associated components in the front compartment (under the vehicle hood 116), which engine may be configured to drive either or both of the front wheels 112 and the rear wheels 112. In some embodiments where the vehicle 100 is gas-powered, the gas-powered engine and associated components may be located in a rear compartment of the vehicle 100, leaving the front compartment available for storage or trunk space or for other uses. In some embodiments, the vehicle 100 may be, in addition to a battery-powered electric vehicle and a gas-powered vehicle, a hybrid electric vehicle, a diesel-powered vehicle, or a fuel cell vehicle.

Although shown in the form of a car, it should be appreciated that the vehicle 100 described herein may include any conveyance or model of a conveyance, where the conveyance was designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, buses, automobiles, trains, railed conveyances, boats, ships, marine conveyances, submarine conveyances, airplanes, space craft, flying machines, human-powered conveyances, and the like.

When a vehicle such as the vehicle 100 is involved in an impact, maintaining occupant safety is critical. However, occupant safety may be compromised if a closure of the vehicle 100 (e.g., a door, a hood, a trunk lid or rear hatch) is pushed by the impact into the passenger compartment. For example, a side collision in which a vehicle traveling perpendicular or nearly so to the vehicle 100 strikes the side 160 of the vehicle 100 could push a door of the vehicle on the side 160 into the passenger compartment. This is likely to happen, for example, if the force of the impact is concentrated in the middle of the door, which may cause the edges of the door to fold opposite the direction of impact and be pulled inward toward the middle of the door as the middle of the door is pushed into the passenger compartment. Additionally or alternatively, an impact on one portion of the door will create a moment arm relative to the edges of the door, which may result in partial rotation of the edges of the door away from the frame 104. With the edges of the door no longer secured against the frame 104, the door may be more easily pushed into the passenger compartment, where it may harm the occupants thereof.

Other closures of the vehicle, such as the hood and the trunk lid or rear hatch, also pose a risk to vehicle passengers during a collision. For example, in a front impact, the force of the impact may drive the hood rearward, into the windshield and possibly into the passenger compartment. Meanwhile, the momentum of the vehicle at the moment of collision may cause a rear trunk lid or hatch to move forward, into the rear window and possibly into the passenger compartment. Similarly, in a rear collision, the force of the impact may drive the rear trunk lid or hatch into the rear window and/or the passenger compartment. The present disclosure is directed to improving impact performance between vehicle closures and body systems, so as to reduce the likelihood of or prevent these harms.

Figure 2:
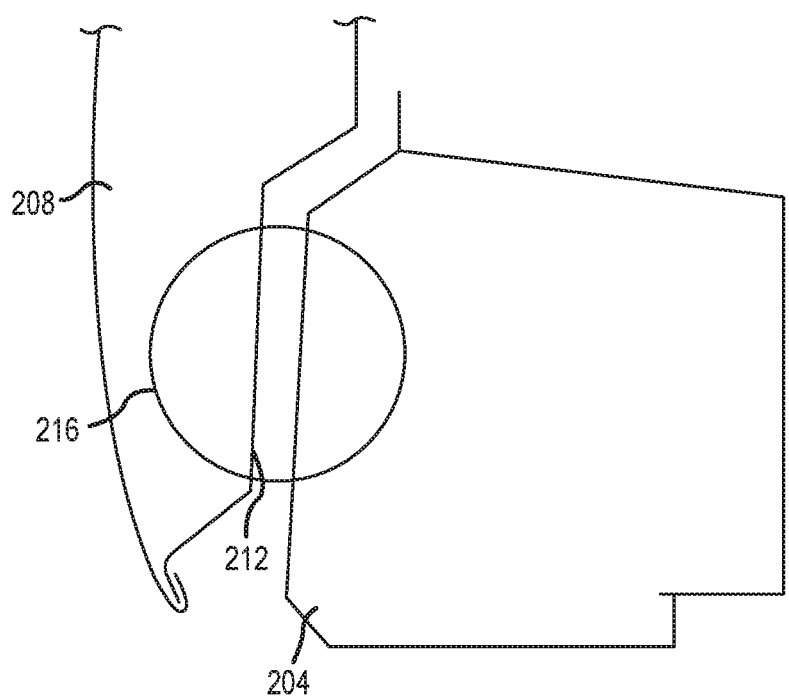
FIG. 2 shows a close up a door-sill interface according to embodiments of the present disclosure.

Turning now to FIG. 2, a sill 204 may be mounted to, or be part of, a frame 104 of a vehicle 100 along an edge of a door opening in the frame 104. The sill 204 may be manufactured, for example, by extrusion, and may be made of metal (e.g., steel, aluminum or an aluminum alloy), plastic (e.g., polypropylene, polyurethane, acrylonitrile butadiene styrene, poly-vinyl-chloride, polyamide, polystyrene, polyethylene, polyoxymethylene, polycarbonate, acrylonitrile styrene acrylate), or another suitable material. The sill 204 may be mounted, for example, along a bottom edge of the door opening, along a front or rear edge of the door opening, and/or along a top edge of the door opening. The sill 204 may be secured to the frame 104, for example, by welding, mechanical fasteners, adhesive, or otherwise.

The term "sill," as used herein, encompasses pillars, rails, and other members that may be positioned adjacent or proximate a closure and that may be provided with the impact performance-improving form and/or structure of the sills described herein. Thus, for example, a sill (as the term is used herein) may be positioned in a vertical orientation along a vertical front or rear edge of a closure, or in a horizontal orientation along a horizontal top or bottom of a closure, or in an angled orientation along an angled portion of a perimeter of a closure.

A door 208 may be operably secured to the frame 104 of the vehicle 100 and movable between an open position (not shown) and a closed position. In the closed position, an inner panel 212 of the door 208 is adjacent to and faces the sill 204. The inner panel 212 may be one of a plurality of components that are assembled together to form the door 208, or the inner panel 212 may simply be an inner surface of a single-piece door 208. In some embodiments, the door 208 may comprise a single panel that has both an outer surface and an inner surface, in which embodiments the inner surface of the panel would correspond to the inner panel 212. The inner panel 212 may be manufactured, for example, by stamping, extrusion, or casting. Additionally, the inner panel 212 may be made of metal (e.g., steel, aluminum or an aluminum alloy), plastic (e.g., polypropylene, polyurethane, acrylonitrile butadiene styrene, poly-vinyl-chloride, polyamide, polystyrene, polyethylene, polyoxymethylene, polycarbonate, acrylonitrile styrene acrylate), or another suitable material. Although the inner panel 212, the door 208, and the sill 204 are shown in FIG. 2 as having a particular profile and shape, the present disclosure is not so limited. Many profiles and shapes of inner panels, doors, and sills may be used in accordance with embodiments of the present disclosure.

FIGS. 3A-5 show various embodiments of the present disclosure as may be implemented, for example, in the area encompassed by circle 216.

Figure 3A:
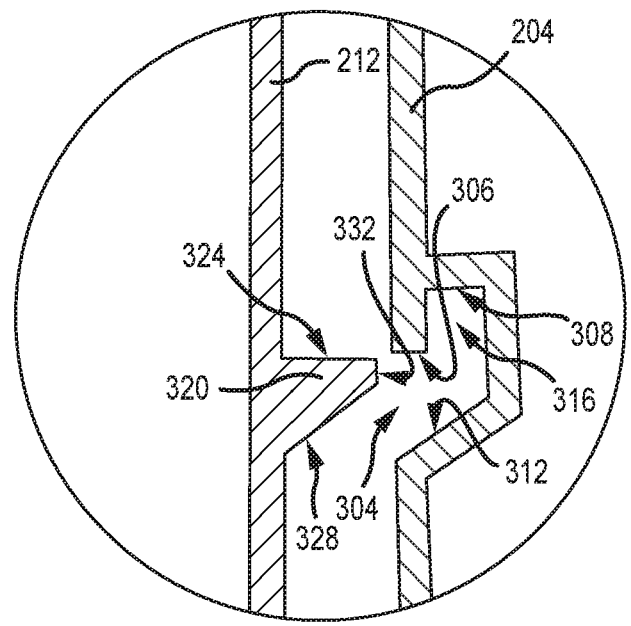
FIG. 3A shows detail of a door-sill interface according to embodiments of the present disclosure.

With reference to FIG. 3A, a sill 204 may comprise an elongate cavity 304. The cavity 304 may have a variety of interior geometries. For example, the cavity 304 may comprise an inner surface 306, a recessed inner surface 308, a slanted or sloped inner surface 312, and/or a subcavity 316. The elongate cavity 304 is integral with the sill 204, meaning that the elongate cavity 304 is defined by the sill 204 itself rather than being formed separately and then attached to the sill 204. Where the sill 204 is extruded, for example, the extrusion mold may be formed (or adapted) to introduce the elongate cavity 304 into the sill 204. As a result, the cost of including the elongate cavity 304 in an extruded sill 204 is minimal, including in terms of cost, material, and weight. In some embodiments, where the sill 204 is solid, the elongate cavity 304 may be milled or otherwise cut into the sill 204. While this manufacturing method requires an extra step (e.g., milling/cutting), and results in the removal and possibly waste of material from the sill 204, the elongate cavity 304 may nevertheless be integral with the sill 204, so as to avoid having to manufacture and then attach to the sill 204 a separate piece that includes the desired cavity.

The inner panel 212 of the door 208 may comprise an elongate protrusion 320, which may have a free end 332 and may be defined by a flat surface 324 and/or a slanted or sloped surface 328. The elongate protrusion 320 is integral with the inner panel 212, meaning that the elongate protrusion 320 is formed as part of the inner panel 212 without being formed separately and then attached to the inner panel 212. Where the inner panel 212 is extruded, for example, the extrusion mold may be formed (or adapted) to define an elongate protrusion 320 on the inner panel 212. Where the inner panel 212 is cast, the molding for the inner panel 212 may include features to define the elongate protrusion 320. With the inner panel 212 formed to include an elongate protrusion 320 (rather than forming the elongate protrusion 320 separately and then attaching the elongate protrusion to the inner panel), the cost of including the elongate protrusion 320 on the inner panel 212 is minimal, including in terms of cost, material, and weight.

The elongate cavity 304 is positioned to receive the elongate protrusion 320 in the event of an impact that drives the door 208 against the sill 204. In some embodiments, the elongate cavity 304 may partially receive the elongate protrusion 320 when the door 208 is closed or in a closed position, while in other embodiments the elongate protrusion 320 may remain clear of the elongate cavity 304 unless and until an impact forces the door 208 (and more specifically, the inner panel 212) against the sill 204.

Given that the elongate cavity 304 is positioned and intended to receive the elongate protrusion 320 at least in the event of an impact, the elongate protrusion 320 and the elongate cavity 304 may be provided with corresponding geometries. For example, the elongate cavity 304 comprises a slanted or sloped inner surface 312, and the elongate protrusion 320 comprises a slanted or sloped surface 328. Contact between these surfaces (e.g., in the event of an impact) will result in an upward force on the inner panel 212 (and thus on the door 208). Additionally, the protrusion 320 has a tapered shape, with a thicker portion adjacent the remainder of the inner panel 212 tapering to a thinner portion at the free end 332. The cavity 304 has an opening sufficiently large to accommodate the thicker portion of the protrusion 320, while the slanted inner surface 312 provides a matching or corresponding taper to the cavity 304.

Figure 3B:
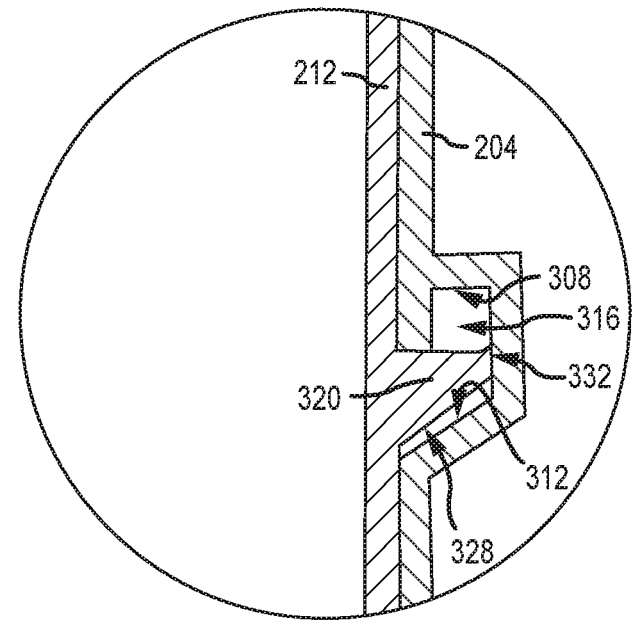
FIG. 3B shows detail of a post-impact door-sill interface according to embodiments of the present disclosure.

FIG. 3B shows the inner panel 212 and sill 204 of FIG. 3A in a post-impact position. The impact may result, for example, from a vehicle or other object striking the door 208 of the vehicle 100, thus exerting a force on the door 208 in the direction of the frame 104 and sill 204. The impact has pressed the inner panel 212 against the sill 204, and more specifically has pushed the elongate protrusion 320 into the cavity 304. The sloping surface 312 of the cavity 304, interacting with the sloping surface 328 of the protrusion 320, has pushed the elongate protrusion 320 firmly against the inner surface 306, which both prevents further upward movement of the inner panel 212 (and thus of the door 208) and provides a friction force that prevents rotation of door 208 (including the inner panel 212) away from the sill 204.

As can also be seen in FIG. 3B, the free end of the elongate protrusion 320 has been deformed slightly upward and into the subcavity 316. This deformation acts to prevent the elongate protrusion 320 from being pulled out of the elongate cavity 304, and thus serves to further prevent rotation of the door 208 (including the inner panel 212) away from the sill 204. Thus, in some embodiments, the elongate protrusion 320 may be designed to partially deform when forced into the elongate cavity 304 so as to further reduce the likelihood that the elongate protrusion 320 will be pulled out of the elongate cavity 304, whether by rotation or translation of the door 208. In other embodiments, however, the elongate cavity 304 may be designed to receive the elongate protrusion 320 without deforming the elongate protrusion 320.

Figure 4A:
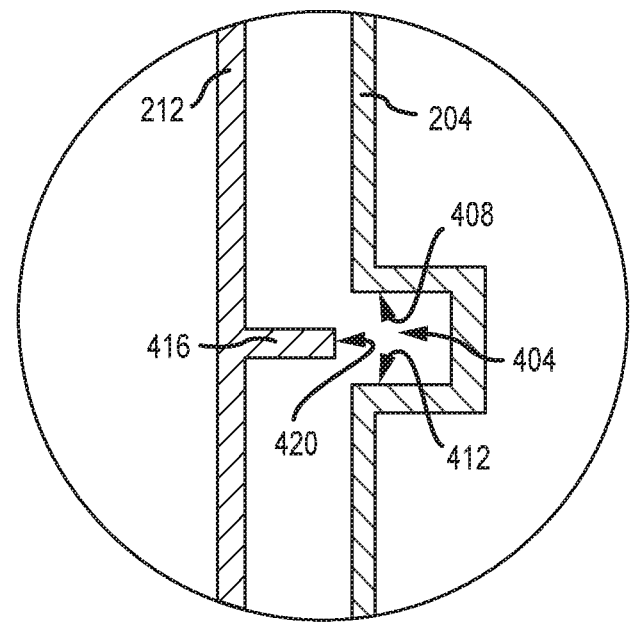
FIG. 4A shows detail of a door-sill interface according to embodiments of the present disclosure.

FIG. 4A illustrates another embodiment of the present disclosure, in which a sill 204 comprises a simple elongate cavity 404 with flat inner surfaces 408 and 412, and an inner panel 212 comprises a simple elongate protrusion 416 having a constant thickness and a free end 420. The elongate cavity 404 is integral with the sill 204, and the elongate protrusion 416 is integral with the inner panel 212. In this embodiment, as in the embodiment of FIGS. 3A-3B, the elongate protrusion 416 may be pushed into the elongate cavity 404 by an impact on the door 208 of which the inner panel 212 forms a part. Any upward movement of the door 208 will be arrested by the elongate protrusion 416 contacting the inner surface 408 of the cavity 404. Although the elongate protrusion 416 is not intended to deform, and the cavity 404 is not designed to secure the elongate protrusion 416 inside the cavity 404, friction between the elongate protrusion 416 and the inner surface 408 (while the elongate protrusion 416 and the inner surface 408 are in contact) will act against any rotational movement of the inner panel 212 (and thus of the door 208) away from the sill 204.

Figure 4B:
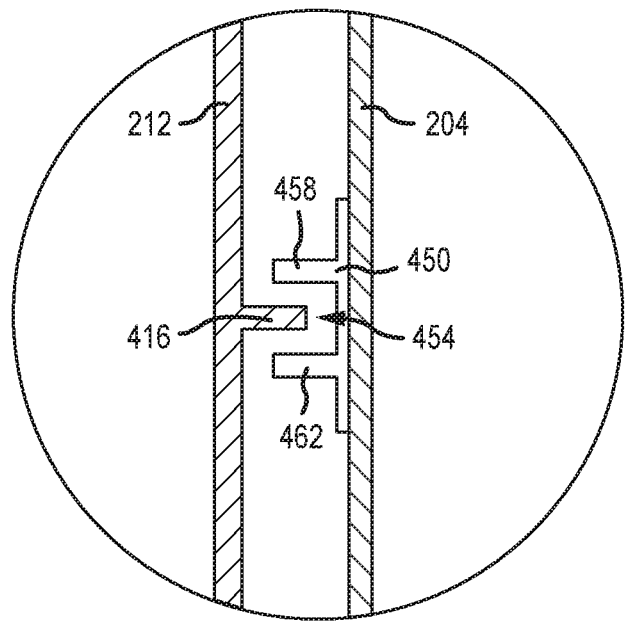
FIG. 4B shows detail of a door-sill interface according to embodiments of the present disclosure.

FIG. 4B illustrates an alternative configuration of the door-sill interface of FIG. 4A, in which the inner panel 212 comprises a simple elongate protrusion 416 as in FIG. 4A. In this configuration, however, the sill 204 does not have an integral elongate cavity, but instead has a bracket 450 attached thereto. The bracket 450 may be attached to the sill 204 by welding, mechanical fasteners, adhesive, or otherwise. The bracket 450 defines an elongate cavity 454 in between an first protrusion 458 and a second protrusion 462. The door-sill interface of FIG. 4B functions in the same manner as the door-sill interface of FIG. 4A. Although the separately formed elongate cavity 454 is shown having a particular geometry, separately formed elongate cavities according to other embodiments of the present disclosure may have any desired geometry. For example, a separately formed elongate cavity 454 may comprise a cavity similar or identical to the cavity 304 of FIGS. 3A-3B.

Use of a bracket 450 comprising a separately formed elongate cavity 454 may be desirable, for example, in situations where the manufacturing method of the sill 204 is not conducive to the inclusion of an integral elongate protrusion, or where the desired geometry of the elongate cavity is incompatible with the manufacturing method of the sill 204. In such a situation, a bracket 450 may be manufactured separately and secured to the sill 204 by welding, mechanical fasteners, adhesive, or any other suitable method.

Figure 5:
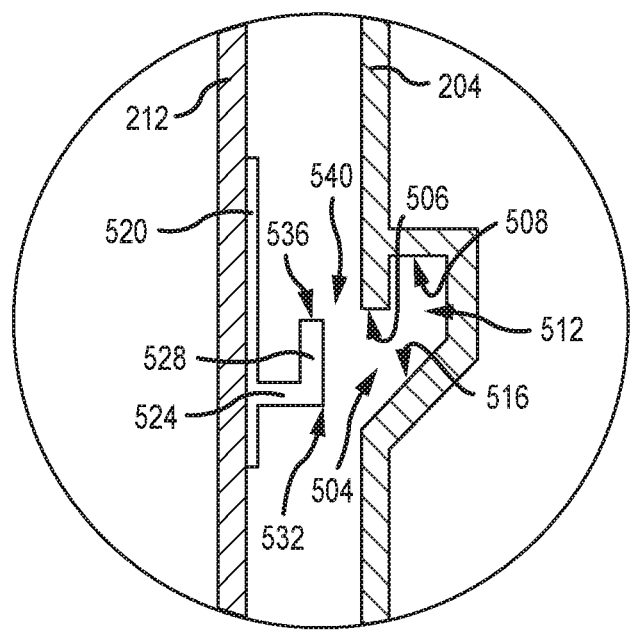
FIG. 5 detail of a door-sill interface according to embodiments of the present disclosure.

Still another embodiment of the present disclosure is illustrated in FIG. 5, where the sill 204 comprises an integral elongate cavity 504, while a separately formed elongate protrusion 540 is attached to the inner panel 212. The elongate cavity 504, like the elongate cavity 304, comprises an inner surface 506, a recessed inner surface 508, a subcavity 512, and a slanted inner surface 516. The elongate protrusion 540 comprises an attachment flange 520, a first portion 524 extending away from the attachment flange 520 (and thus away from the inner door panel 212 and door 208), and a second portion 528 extending perpendicular to the first portion 524 and terminating in a free end 536, with the intersection of the first portion 524 and the second portion 528 defining an elbow 532. Although the separately formed elongate protrusion 540 is shown having a particular geometry, separately formed elongate protrusions according to other embodiments of the present disclosure may have any desired geometry. For example, a separately formed elongate protrusion 540 may comprise a protrusion similar or identical to the protrusion 320 of FIGS. 3A-3B, or may comprise a protrusion similar or identical to the protrusion 416 of FIG. 4.

A separately formed elongate protrusion 540 may be desirable, for example, in situations where the manufacturing method of the inner panel 212 is not conducive to the inclusion of an integral elongate protrusion, or where the desired geometry of the elongate protrusion is incompatible with the manufacturing method of the inner panel 212. Thus, for example, where an elongate protrusion having an L-shaped cross section (like the elongate protrusion 540) is desired, but the inner panel 212 is manufactured by stamping or casting, it may be uneconomical or even impossible to manufacture the inner panel 212 with an integral L-shaped elongate protrusion. In such a situation, an elongate protrusion 540 may be manufactured separately and secured to the inner panel 212 by welding, mechanical fasteners, adhesive, or any other suitable method.

With reference still to FIG. 5, an impact on the door 208 of which the inner panel 212 is a part will force the elongate protrusion 540 into the cavity 504, where the elbow 532 will contact the slanted inner surface 516 and push the elongate protrusion 540—and thus the inner panel 212 and the door 208) upward. As the elongate protrusion 540 moves within and into the cavity 504, the free end 536 will rise into the subcavity 512, above the inner surface 506. This interlocking of the elongate protrusion 540 and the elongate cavity 504 will prevent both the translation and rotation of the door 208, thus improving the safety of the vehicle occupants during the collision.

Although FIG. 5 illustrates the elongate protrusion 540 as being formed separately from the inner panel 212 and subsequently attached thereto, in some embodiments the elongate cavity 504 may be provided in a separately formed bracket that is subsequently attached to the sill 204, while an elongate protrusion is provided integrally with the inner panel 212.

Figure 8:
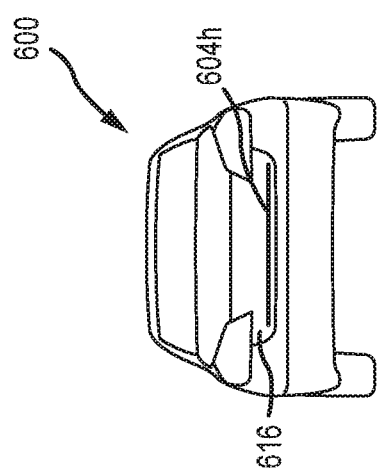
FIG. 8 shows a rear elevation view of a vehicle according to embodiments of the present disclosure.
Figure 6:
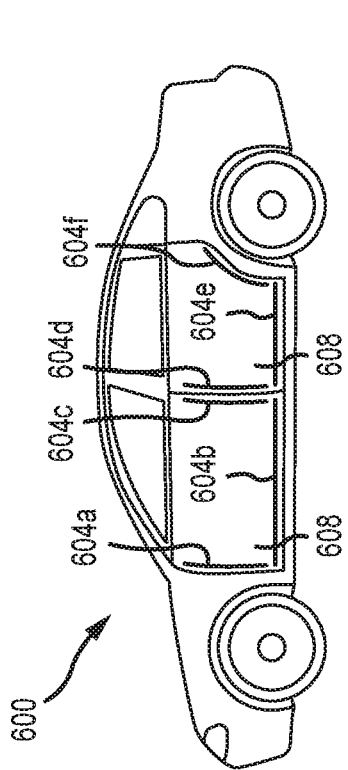
FIG. 6 shows a side elevation view of a vehicle according to embodiments of the present disclosure.
Figure 7:
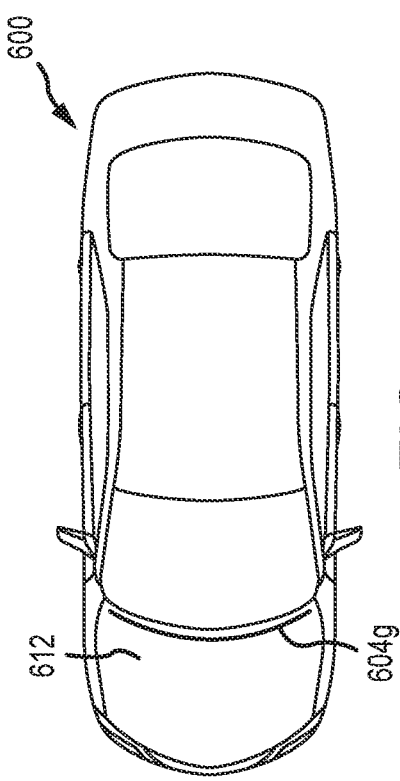
FIG. 7 shows a top plan view of a vehicle according to embodiments of the present disclosure.

FIGS. 6-8 illustrate a vehicle 600, which may be the same as or similar to the vehicle 100. Although the vehicle 600 is shown as having a particular form, the present disclosure is not limited to vehicles with the form of the vehicle 600. Rather, the vehicle 600 is used to show where on a vehicle, by way of example only, embodiments of the present disclosure may be used. For example, in FIG. 6, the lines 604a, 604b, 604c, 604d, 604e, and 604f indicate some locations suitable for providing an elongate protrusion on an inner panel of the doors 608, with a corresponding elongate cavity provided on a sill secured to a frame of the vehicle 600. Other locations may also be suitable for such an elongate protrusion and elongate cavity. FIG. 7 shows a line 604g indicating a location suitable for providing an elongate protrusion on the underside of a hood 612 of the vehicle 600, with a corresponding elongate cavity on a sill (which may be, for example, a cowl) secured to the frame of the vehicle 600 underneath the line 604g. FIG. 8 shows a line 604h indicating a location suitable for providing an elongate protrusion on the inner side of a rear hatch or trunk lid 616 of the vehicle 600, with a corresponding elongate cavity on a sill or other component secured to the frame underneath the line 604h.

An elongate protrusion according to embodiments of the present disclosure may be linear or curved. For example, an elongate protrusion provided along a lower edge of a door (e.g., in the position 604b or 604e) may be linear, while an elongate protrusion provided along a rear edge of a hood (e.g., in the position 604g) may be curved. However, it should be appreciated that although the line 604g is shown as curved, one or more linear elongate protrusions may be used (with one or more corresponding linear elongate cavities) instead of a single curved linear protrusion (with a corresponding curved elongate cavity). Where an elongate protrusion is linear, the corresponding elongate cavity is also linear (and vice versa). Similarly, where an elongate cavity is curved, the corresponding elongate protrusion is also curved (and vice versa).

As may be appreciated from examination of FIGS. 6-8, elongate protrusions and elongate cavities of the present disclosure extend along an edge of a vehicle closure, and thus beneficially distribute forces experienced by a portion of the elongate protrusion along the entire elongate protrusion and to the sill via the elongate cavity. The use of an elongate protrusion and an elongate cavity significantly improves impact performance, especially relative to the use of locking pins or other structures, devices, or mechanisms that limit movement of a door relative to a sill or body or frame only at discrete points.

Figure 9:
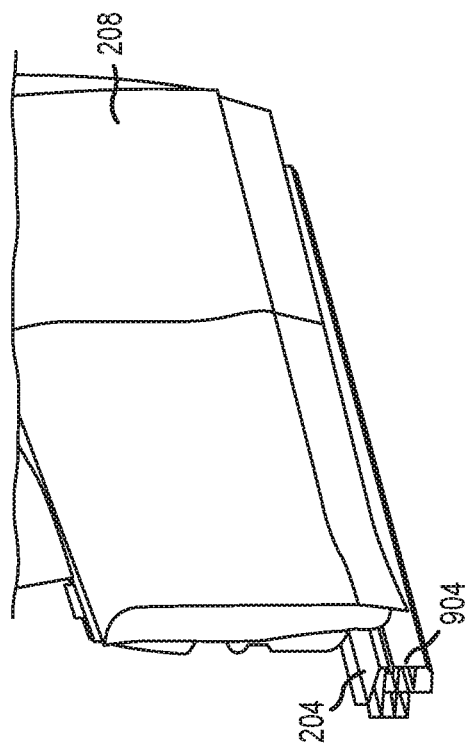
FIG. 9 shows a door-sill interface according to embodiments of the present disclosure.
Figure 10:
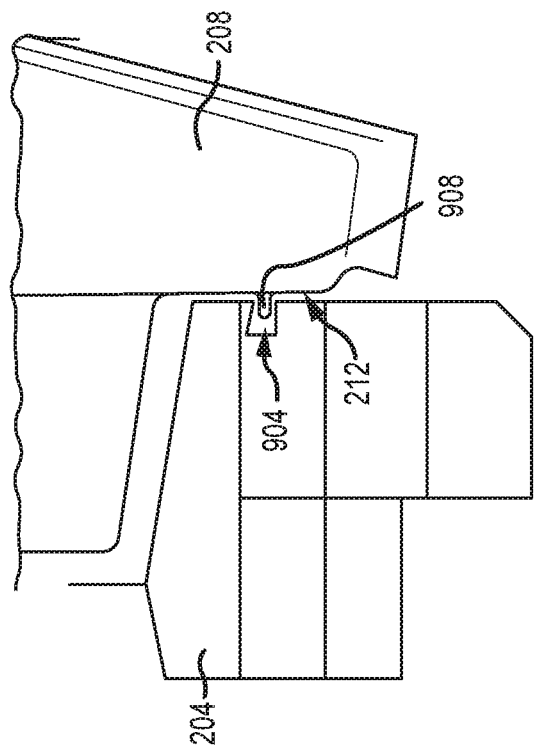
FIG. 10 shows a perspective view of a door-sill interface according to embodiments of the present disclosure.

FIGS. 9-10 show another embodiment of a sill 204 and of a portion of a door 208 with an inner panel 212. The sill 204 of FIG. 9, which is extruded, comprises an elongate cavity 904 that is positioned opposite an elongate protrusion 908 extending from the inner panel 212. The elongate cavity 904 extends along all or substantially all of the sill 204, and the elongate protrusion 908 extends along a length of the door 208 adjacent or proximate to a lower edge of the door 208. Although the elongate cavity 904 and elongate protrusion 908 of FIGS. 9-10 are shown along the bottom edge of the door 208, an elongate cavity and an elongate protrusion may additionally or alternatively be provided along other edges of a door 208 and/or along one or more edges of a closure other than a door 208.

Although the sills and cowls described herein have been described as being secured to the frame, in some embodiments, a sill and/or cowl comprising an elongate cavity may be secured to fixed portions of the body of the vehicle (e.g., portions of the body that are not movable closures such as doors, hoods, or trunk lids, and that are not otherwise intended to change position during normal operation of the vehicle), which may in turn be secured to a frame of the vehicle, rather being secured directly to the frame of the vehicle.

While the various embodiments described herein include an elongate protrusion on a closure (e.g., a door, a hood, a trunk lid or rear hatch), and an elongate cavity on a sill or cowl, in some embodiments the elongate cavity may be provided on the closure, and the elongate protrusion may be provided on the sill or cowl.

Additionally, the present disclosure is not limited to the elongate protrusion and elongate cavity geometries illustrated in the figures. Any geometry may be used for the elongate protrusion and the elongate cavity, provided that the elongate cavity is configured to receive the elongate protrusion and limit movement of the door in at least one direction during an impact event.

A number of variations and modifications of the disclosure can be used. It would be possible to provide for some features of the disclosure without providing others.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Embodiments include a vehicle comprising: a frame having an outer side and an inner side, the frame comprising a door opening; a door sill secured to the frame and extending along an edge of the door opening, the door sill extruded to comprise an elongate cavity; and a door secured to the frame and comprising an elongate protrusion, the door movable between an open position and a closed position, wherein the elongate cavity is positioned to receive the elongate protrusion when the door is in the closed position.

Aspects of the above vehicle include: wherein the elongate protrusion is fastened to the door; wherein the elongate protrusion is provided on a cast panel of the door, and the elongate protrusion is integral with the panel; wherein the elongate cavity comprises an interior surface slanted relative to the elongate protrusion, the slanted interior surface positioned to deflect an end of the elongate protrusion if the elongate protrusion contacts the slanted interior surface; wherein the elongate cavity comprises an interior subcavity, the interior subcavity positioned to receive the deflected end of the elongate protrusion; wherein the elongate protrusion tapers from a first thickness adjacent the door to a second thickness away from the door; wherein the elongate protrusion has a uniform thickness; wherein the elongate protrusion comprises a first portion extending away from the door and a second portion extending perpendicular from the first portion and terminating in a free end, the intersection of the first portion and the second portion defining an elbow; wherein the elongate cavity comprises a slanted first surface and a recessed second surface; and wherein the slanted lower surface is positioned to deflect the free end toward the recessed second surface if the elbow contacts the slanted lower surface.

Embodiments also include a vehicle comprising: a frame comprising an opening; a closure secured to the frame and movable between an open position and a closed position, wherein the closure substantially covers the opening when in the closed position; an elongate protrusion extending from an inner panel of the closure near an edge of the closure; and a sill secured to the frame along an edge of the opening, the sill comprising an elongate cavity positioned to receive the elongate protrusion when the closure is in the closed position, wherein the elongate protrusion is integral with the inner panel or the elongate cavity is integral with the sill.

Aspects of the above vehicle include: wherein the closure is a hood, the elongate protrusion extends downward from the hood near a rear edge of the hood, and the sill is a cowl; wherein the closure is a door, and the elongate protrusion extends from a lower edge of the door; wherein the closure is a door, and the elongate protrusion extends from a front or rear edge of the door; wherein the closure is a hatch or trunk lid, and the elongate protrusion extends from a lower edge of the hatch or trunk lid; wherein the elongate protrusion is integral with the inner panel and the elongate cavity is formed in a bracket fastened to the sill; and wherein the elongate cavity has a geometry configured to deform the elongate protrusion to interlock the elongate cavity and the elongate protrusion if the elongate protrusion is driven into the elongate cavity with sufficient force.

Embodiments further include a vehicle assembly comprising: a door operably secured to a frame, the door configured to be opened and closed; a linear protrusion extending from the door proximate an edge of the door; a sill fixedly secured to the frame along an edge of the frame that corresponds to the edge of the door; and a linear cavity in the sill, the linear cavity positioned opposite the linear protrusion when the door is closed, wherein the linear cavity is integral with the sill or the linear protrusion is integral with the door.

Aspects of the foregoing vehicle assembly include: wherein the linear cavity comprises a slanted first interior surface opposite a recessed second interior surface; wherein the sill is a single extruded piece.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

What is claimed is:

1. A vehicle, comprising:
   a frame having an outer side and an inner side and comprising a door opening;
   a door sill secured to the frame and extending along an edge of the door opening, the door sill extruded to comprise an elongate cavity; and
   a door secured to the frame in proximity to the door opening and comprising an elongate protrusion, the door being movable, relative to the door opening, between an open position and a closed position,
   wherein the elongate cavity is positioned to receive the elongate protrusion when the door is in the closed position,
   wherein the elongate cavity comprises a slanted first interior surface, and
   wherein the slanted first interior surface is positioned to deflect an end of the elongate protrusion if the elongate protrusion contacts the slanted first interior surface.

2. The vehicle of claim 1, wherein the elongate protrusion is fastened to the door.

3. The vehicle of claim 1, wherein the elongate protrusion is provided on a cast panel of the door, and the elongate protrusion is integral with the panel.

4. The vehicle of claim 1, wherein the slanted first interior surface is slanted relative to the elongate protrusion if the elongate protrusion contacts the slanted first interior surface.

5. The vehicle of claim 4, wherein the elongate cavity further comprises an interior subcavity, the interior subcavity positioned to receive the deflected end of the elongate protrusion.

6. The vehicle of claim 1, wherein the elongate protrusion tapers from a first thickness adjacent the door to a second thickness away from the door.

7. The vehicle of claim 1, wherein the elongate protrusion has a uniform thickness.

8. The vehicle of claim 1, wherein the elongate protrusion comprises a first portion extending away from the door and a second portion extending perpendicular from the first portion and terminating in a free end, the intersection of the first portion and the second portion defining an elbow.

9. The vehicle of claim 8, wherein the elongate cavity further comprises a recessed second surface.

10. The vehicle of claim 9, wherein the slanted first interior surface is positioned to deflect the free end towards the recessed second surface if the elbow contacts the slanted first interior surface.

11. A vehicle, comprising:
a frame comprising an opening;
a closure secured to the frame and movable between an opened position and a closed position, wherein the closure substantially covers the opening when in the closed position;
an elongate protrusion extending from an inner panel of the closure near an edge of the closure; and
a sill secured to the frame along an edge of the opening, the sill comprising an elongate cavity positioned to receive the elongate protrusion when the closure is in the closed position,
wherein the elongate protrusion is integral with the inner panel or the elongate cavity is integral with the sill,
wherein the elongate cavity comprises a slanted interior surface, and
wherein the slanted first interior surface is positioned to deflect an end of the elongate protrusion if the elongate protrusion contacts the slanted first interior surface.

12. The vehicle of claim 11, wherein the closure is a hood, the elongate protrusion extends downward from the hood near a rear edge of the hood, and the sill is a cowl.

13. The vehicle of claim 11, wherein the closure is a door, and the elongate protrusion extends from a lower edge of the door.

14. The vehicle of claim 11, wherein the closure is a door, and the elongate protrusion extends from a front or rear edge of the door.

15. The vehicle of claim 11, wherein the closure is a hatch or trunk lid, and the elongate protrusion extends from a lower edge of the hatch or trunk lid.

16. The vehicle of claim 11, wherein the elongate protrusion is integral with the inner panel and the elongate cavity is formed in a bracket fastened to the sill.

17. The vehicle of claim 11, wherein the elongate cavity has a geometry configured to deform the elongate protrusion to interlock the elongate cavity and the elongate protrusion if the elongate protrusion is driven into the elongate cavity with sufficient force.

18. A vehicle assembly, comprising:
a door operably secured to a frame, the door configured to be opened and closed;
a linear protrusion extending from the door proximate an edge of the door;
a sill fixedly secured to the frame along an edge of the frame that corresponds to the edge of the door; and
a linear cavity in the sill, the linear cavity positioned opposite the linear protrusion when the door is closed,
wherein the linear cavity is integral with the sill or the linear protrusion is integral with the door,
wherein the linear cavity comprises a slanted first interior surface, and
wherein the slanted first interior surface is positioned to deflect an end of the elongate protrusion if the elongate protrusion contacts the slanted first interior surface.

19. The vehicle assembly of claim 18, wherein the slanted first interior surface is provided opposite a recessed second interior surface.

20. The vehicle assembly of claim 18, wherein the sill is a single extruded piece.

* * * * *

UNITED STATES PATENT AND TRADEMARK OFFICE
CERTIFICATE OF CORRECTION

PATENT NO. : 10,836,437 B2
APPLICATION NO. : 16/233957
DATED : November 17, 2020
INVENTOR(S) : Paul R. Murray et al.

It is certified that error appears in the above-identified patent and that said Letters Patent is hereby corrected as shown below:

In the Claims

Claim 4, Column 10, Lines 66-67, delete "if the elongate protrusion contacts the slanted first interior surface" therein.

Signed and Sealed this
Nineteenth Day of January, 2021

Andrei Iancu
*Director of the United States Patent and Trademark Office*